United States Patent [19]

Fuderer

[11] Patent Number: 4,499,208

[45] Date of Patent: Feb. 12, 1985

[54] ACTIVATED CARBON ADSORBENT WITH INCREASED HEAT CAPACITY AND THE PRODUCTION THEREOF

[75] Inventor: Andrija Fuderer, Antwerpen, Belgium

[73] Assignee: Union Carbide Corporation, Danbury, Conn.

[21] Appl. No.: 494,547

[22] Filed: May 13, 1983

[51] Int. Cl.³ .................. B01J 20/08; B01J 20/20; B01J 31/08; B01D 53/04
[52] U.S. Cl. ............................. 502/415; 55/25; 55/66; 55/68; 502/406; 502/413
[58] Field of Search ............. 502/415, 413, 406, 417, 502/423, 429; 55/25

[56] References Cited

U.S. PATENT DOCUMENTS

| | | | |
|---|---|---|---|
| 1,530,392 | 3/1925 | Morrell | 502/415 |
| 2,727,023 | 12/1955 | Evering et al. | 260/94.9 |
| 3,091,550 | 5/1963 | Doying | 117/76 |
| 3,135,696 | 6/1964 | Ruelle et al. | 252/182 |
| 3,430,418 | 3/1969 | Wagner | 55/25 |
| 3,658,724 | 4/1972 | Stiles | 252/446 |
| 3,819,532 | 6/1974 | Cracknell et al. | 252/447 |
| 3,842,014 | 10/1974 | Friend et al. | 252/447 |
| 3,960,771 | 6/1976 | Tanaka et al. | 252/446 |
| 4,242,226 | 12/1980 | Siren | 252/422 |
| 4,259,299 | 3/1981 | Hagiwara et al. | 55/68 |

FOREIGN PATENT DOCUMENTS 55-61915  5/1980  Japan ..................... 55/25

*Primary Examiner*—P. E. Konopka
*Attorney, Agent, or Firm*—Alvin H. Fritschler

[57] ABSTRACT

The heat capacity of activated carbon adsorbent pellets is enhanced by the mixing of activated carbon powder with a higher heat capacity, inert inorganic material, such as dense alumina, prior to pelletizing. The resulting doped adsorbent enhances the operation of adiabatic pressure swing adsorption processes by decreasing the cyclic temperature change in the adsorbent bed during each processing cycle of the process.

17 Claims, No Drawings

ACTIVATED CARBON ADSORBENT WITH INCREASED HEAT CAPACITY AND THE PRODUCTION THEREOF

BACKGROUND OF THE INVENTION

1. Field of the Invention

The invention relates to activated carbon adsorbents. More particularly, it relates to enhancing the performance thereof for advantageous use in pressure swing adsorption processes.

2. Description of the Prior Art

Activated carbon and other adsorbent materials capable of selectively adsorbing a component of a gas mixture can advantageously be employed in pressure swing adsorption (PSA) processing used to separate and purify hydrogen or other desired gases present in available feed gas streams. The PSA process is well known in the art, as evidenced by such patents as Wagner, U.S. Pat. No. 3,430,418 and Fuderer et al, U.S. Pat. No. 3,986,849. Hydrogen in a feed gas, for example, can conveniently be separated and purified from other components of a feed gas stream, i.e., carbon dioxide, nitrogen, carbon monoxide, methane, ethane and the like, by means of the PSA process.

In the PSA, the feed gas stream is typically passed to an adsorbent bed, or to a PSA system comprising a number of such beds, at an elevated adsorption pressure, with a purified product effluent gas being recovered from the adsorbent bed at the elevated adsorption pressure level. The selectively adsorbed components(s) of the feed gas are thereafter desorbed from the adsorbent material and removed from the bed at a lower desorption pressure level. As cyclic processing operations continue, the adsorbent bed is repressurized to the elevated adsorption pressure, and depressurized to the lower desorption pressure, on a continuing basis. In various multi-bed embodiments of the PSA process, such cyclic operations occur in overlapping processing sequence in a number of adsorbent beds as will readily be appreciated by those skilled in the art.

The heat effects that occur at the adsorption and desorption pressures, and at intermediate pressure levels, are found to be of significance in the overall performance of the PSA process. As the process is essentially adiabatic, the heat of adsorption causes an increase in bed temperature during each adsorption step. Because of this increased temperature, the final loading of the adsorbed components is lower than would be the case if no such increase in temperature were to occur. As the adsorbent bed is depressurized to its lower desorption pressure and during the typical purge step to facilitate desorption and bed regeneration, on the other hand, the adiabatic desorption action results in a decrease in bed temperature. Because of this decreased temperature during desorption, the residual adsorbate loading is higher than would be the case if no such decrease in temperature were to occur during desorption. The fluctuation in bed temperature thus reduces the differential loading of the bed in two ways, i.e., by causing lower than desired loading at the end of adsorption and higher than desired residual loading at the end of desorption. This undesirable difference between the highest and lowest temperatures in a pressure swing adsorption cycle can, in practical cases, exceed 30° C., and it can reduce the difference in adsorbate loading of the bed between the end of the adsorption step and the end of the desorption step, i.e., the delta loading, by as much as 50% in some cases. It will be appreciate that the development of convenient means for reducing bed temperature fluctuations during PSA operations would be advantageous in the art. One approach to achieving such a reduction relates to the use of improved adsorbent materials capable of being used in the PSA processing cycle with lower bed temperature fluctuations than occur using the presently available adsorbents.

It is an object of the invention, therefore, to provide an improved adsorption suitable for use in pressure swing adsorption operations.

It is another object of the invention to provide a process for modifying conventional activated carbon adsorbent so as to improve its operating performance in the practice of the PSA process.

It is a further object of the invention to provide a process for modifying conventional activated carbon adsorbent material such as to reduce the temperature fluctuations of such material when employed in the PSA process for gas separation.

SUMMARY OF THE INVENTION

Activated carbon pellets suitable for use in the adsorbent beds of pressure swing adsorption systems are prepared by mixing a volume-based higher heat capacity, inert inorganic material with a partially activated carbon powder prior to pelletizing of the powder. Dense alumina in the form of corundum is advantageously used for this purpose.

DETAILED DESCRIPTION OF THE INVENTION

The objects of the invention are accomplished by mixing a higher heat capacity inert inorganic material, as further described below, with partially activated carbon powder prior to its pelletization and further activation. By adding to the heat capacity of activated carbon adsorbent in this manner, the cyclic bed temperature fluctuations encountered during pressure swing adsorption processing can be reduced so as to overcome the undesired reduction in the difference in adsorbate loading of the bed between the end of the adsorption step and the end of the desorption step.

As referred to herein, activated carbon refers generally to black, solid carbonaceous material, such as charcoal, bone charcoal, sugar charcoal, carbon produced from oil products, coconut carbon, and the like, which remain subsequent to the decomposition of organic material by pyrolysis and which, during or after the pyrolysis, have undergone an activating process. One such activating process includes reaction of carbon with steam at an elevated temperature of at least about 600° C., for example at about 800° C. Another activating process involves reaction with steam and air, typically at somewhat lower temperatures than are employed in the steam activation of the carbon.

Activated carbon is a porous material having characteristically high carbon content and large specific surface area. Thus, activated carbon is not a homogenous, well defined material, but rather a mixture of amorphous carbon and graphite crystals. The ratio of such forms of carbon included in the mixture depends on many factors, all of which may not be well known or defined, although the choice of starting material from which the carbon is derived is understood to have a decisive effect on the properties of the activated carbon produced.

As prepared for use as an adsorbent material in pressure swing adsorption operations and for other adsorbent purposes, activated carbon in the form of partially activated carbon powder is commonly treated by the addition of a binder, followed by pelletizing of the powder-binder mixture and further activation of the resulting pellets at elevated temperature. The pelletizing process employed in conventional practice, and for purposes of the invention, comprises any known and convenient pelletizing technique, such as granulating or extruding the mixture to be pelletized through a suitable die. Similarly, the binder employed comprises any known binder composition suitable for the intended purpose. Illustrative examples of well known binder compositions include pitch, bitumin, tar, tar oil, and the like.

In accordance with the practice of the invention, the higher heat capacity, inert inorganic material is conveniently added to the partially activated carbon powder prior to its pelletization by conventional techniques as indicated above. The partially activated carbon powder is generally obtained by grinding raw activated carbon material to a desired particle size on the order of from about 20 to about 80 microns. The activated carbon powder typically has an average particle size on the order of about 30 microns. If the inert inorganic material were to be added in pellet form to the adsorbent, the very thorough mixing operation required to properly mix the inert inorganic material with the adsorbent would provide an undesirable operational complication in practical commercial operations. By the use of higher heat capacity, inert inorganic materials available in a particle size range convenient for mixing with the activated carbon powder in its available ground form, the mixing of the inert inorganic material and the activated carbon powder is simplified and facilitated. In desirable embodiments of the invention, the inert inorganic material is thus employed in a particle size range approximating that of the activated carbon powder.

The inert inorganic material is added to the activated carbon powder in an amount of from about 1% to about 25% by volume based on the total volume of the mixture of inert inorganic material and activated carbon powder. The amount of such inert inorganic material thus employed is preferably from about 1% to about 15%, more preferably from about 5% to about 10%, based on the total volume of said mixture. It should be noted that the binder referred to above will generally be present in an amount within the range of from about 0.5 to about 4.0% by weight of said binder based on the total weight of said activated carbon—inert, inorganic material—binder composition that is pelletized and further activated as indicated above.

The higher heat capacity additive to the activated carbon adsorbent is desirably a high density, inert organic material capable of providing an advantageous increase in the heat capacity of the adsorbent for the purposes expressed herein, generally within the concentration limits set forth above. Iron or iron oxides are examples of suitable, high density inert inorganic materials that have a higher heat capacity than said activated carbon adsorbent so as to be suitable for use in the practice of the invention. In this regard, it should be noted that the higher heat capacity of the inert inorganic material for advantageous use in the practice of the invention is to be understood as pertaining on a volume basis rather than on a weight basis. Thus, although the heat capacity, i.e. specific heat, of activated carbon and of an inert inorganic material may be about the same on a weight basis, the heat capacity of the inert inorganic material may be very appreciably higher than that of activated carbon on a volume basis because it has a greater density than the activated carbon. While dense carbon, such as graphite has a greater density than activated carbon, and hence a volume-based higher heat capacity, the high density, inert inorganic material useful in the practice of the invention will nevertheless generally have a higher density than such dense carbon and, hence, a higher heat capacity than that of dense carbon as well. The preferred inert inorganic material for overall convenience and performance is dense alumina in the form of corundum. Such dense alumina has a specific heat, i.e. heat capacity, that is about the same as that of carbon on a weight basis, i.e. close to 0.2 BTU/lb° F. On a volume basis, however, the heat capacity of dense alumina is nearly ten times that of activated carbon as employed in adsorbent beds. Where the heat capacity of activated carbon may be on the order of about 6 BTU/ft$^3$°F. on a volume basis, that of dense alumina is on the order of about 50 BTU/ft$^3$°F. Dense carbon, on the other hand, has a heat capacity on the order of about 18 BTU/ft$^3$°F. It will be appreciated that the volume based differences in the heat capacity of such materials is related to the differences in densities thereof.

In preferred embodiments of the invention, a doped activated carbon adsorbent is conveniently prepared by the addition of particles of dense alumina to the partially activated carbon powder prior to pelletizing, as herein described. In the manufacture of alumina by means of the Bayer process, accounting for most of the world capacity, bauxite is treated with lye, and aluminum hydrate, $Al(OH)_3$, is precipitated from the aluminate liquor. The aluminate hydrate can be recovered for use in various applications. In the production of alumina, however, the aluminate hydrate precipitated from the aluminate liquor is subsequently calcined at temperatures in excess of 1150° C. in rotating ovens. The dense alumina obtained is corundum or alumina ($Al_2O_3$). As is well known in the art, alumina is the raw material for aluminum electrolysis.

Dense alumina has a high particle density of 4,000 kg/m$^3$ and an average particle size of between about 10 and about 100 microns, commonly between about 24 and 61 microns. This material is available commercially in large quantities and at relatively low cost. Since the particle size of commercially available alumina is very close to the particle size to which partially activated carbon powder is ground, prior to its pelletizing, the alumina and the activated carbon powder can be readily mixed in the practice of the invention.

The increased heat capacity, doped activated carbon adsorbent of the invention can be advantageously employed in PSA applications, especially when the components to be selectively adsorbed are strongly adsorbed materials, such as carbon dioxide of $C_3$+hydrocarbons, and are present in the feed gas at relatively high partial pressure. When molecular sieve zeolites frequently employed for pressure swing adsorption separations are used, for example, to selectively adsorb carbon dioxide from a feed gas stream, the carbon dioxide is found to be strongly adsorbed and not as readily desorbed by pressure reduction as when activated carbon is employed as the adsorbent material. Carbon dioxide is found, however, to have a relatively large heat of adsorption, rendering the use of the doped adsorbent of the invention particularly advantageous for use in partial commercial operations.

It will be appreciated from the above that mixed activated carbon—dense alumina will have a higher density and volumetric heat capacity than unmixed activated carbon. Whereas activated carbon alone has a bulk density of about 460 kg/m$^3$, the addition of 5% by volume dense alumina increases its bulk density to about 570 kg/m$^3$, and the addition of 10% by volume dense alumina results in a bulk density of about 670 kg/m$^3$ for the mixed carbon-alumina. Similarly, the heat capacity of activated carbon at 20° C. is increased from about 0.33J/cm$^3$ for about 0.415 by a 5% by volume addition of dense alumina and to about 0.50 by a 10% by volume addition of said dense alumina. Thus, it will be seen that, by the addition of 10 volume % dense alumina to activated carbon powder, the bulk density and the heat capacity of the activated carbon can be increased by about 45%.

In an illustrative example of the benefits that can be achieved in the practice of the invention, the use of a 100% activated carbon was compared with the use of the same carbon material with 10% of the volume thereof replaced by dense alumina. The specific heat of the undoped activated carbon, of dense alumina and of the doped carbon containing 10 volume % dense alumina, at 25° C., are 0.17, 0.185, and 0.1758 BTU/lb° F. (or Kcal/kg° C.), respectively. The feed gas used for comparative PSA runs comprised 63.5 mol % hydrogen, 32.9% $CO_2$, 2.6% CO, and 1% $CH_4$. The volume of the adsorbent bed employed was 18 cubic feet. The bulk density of the undoped activated carbon adsorbent was 30 lb/ft$^3$, whereas that of the doped activated carbon was 46 lb/ft$^3$. In each comparative run, the feed gas or adsorption pressure was 500 psia, the bed was then cocurrently depressurized by release of void space gas from the product end of the bed down to a cut-off pressure of 115 psia, after which the bed was countercurrently depressurized with release of gas from the feed end of the bed down to a lower desorption pressure of 21 psia, at which pressure the bed was purged. In the run using undoped activated carbon, the feed gas flow was 2.8 lb mol, while it was 3.0 in the run using doped adsorbent because of the higher obtainable delta loading thereon. Purge gas flow in each instance was 0.2 lb mol. the maximum temperature swing, observed at a point 50% along the length of the bed from the feed end thereof, was about 590°-691° R for the run using undoped carbon and about 590°-665° R in the run using doped absorbent. The lowest temperature in the bed was at a point 5% along the length of the bed from the feed end, being 459° R in the run using undoped adsorbent and 470.9° R in the run using doped adsorbent. Product hydrogen gas recovery was 84.2% in the run using undoped adsorbent (based on waste gas profile), but was increased to 86.4% by the use of the doped adsorbent of the invention.

The same volume of bed was found to be able to process 7% more feed gas using the doped adsorbent despite the fact that, in such instance, the bed contained 10% less active adsorbent material. Based on the initial and final profiles for the $CO_2$ component, it was estimated that, in additional runs, the doped adsorbent bed would be able to process about 10% more feed gas than the undoped adsorbent bed. For the same processing duty, the adsorbent bed volume for pressure swing adsorption operations processing said feed gas could thus be reduced by about 10% as compared with beds using conventional, i.e. undoped, activated carbon adsorbent.

It should be noted that the doped adsorbents of the invention are not applicable for advantageous use in all PSA separations. As indicated above, the preferred field of use of such doped adsorbents is in applications wherein $CO_2$ or more strongly adsorbed impurities are present in the feed gas at relatively high partial pressure levels. The doped adsorbent of the invention thus appears to offer partial commercial advantages when, for example, the $CO_2$ partial pressure in a feed gas is in excess of 4 bar (60 psia), and such advantages would appear likely to increase at higher partial pressures of said $CO_2$. In comparative studies using a feed gas from partial oxidation or coal gasification operations, the doped activated carbon adsorbent of the invention appears to be clearly superior in performance as compared with conventional, undoped activated carbon at a $CO_2$ partial pressure of 11 bar.

Those skilled in the art will appreciate that various changes and modifications can be made in particular embodiments herein described without departing from the scope of the invention as set forth in the appended claims.

Thus, while the higher heat capacity, inert inorganic material has been described with particular reference to the preferred use of dense alumina as the dopant, it will be appreciated that other suitable inert inorganic materials may be employed, such as iron or iron oxides as mentioned above or other high density and high specific heat materials that, when added to activated carbon in amounts generally within the concentration ranges set forth herein, will serve to enhance the volume-based heat capacity of the mixture of activated carbon and said inert inorganic material. Those skilled in the art will appreciate that the desirability of employing any particular inert inorganic material as a dopant herein will depend on a number of factors, such as the cost of the material, its availability in a particle size range suitable for mixing with activated carbon powder as it is commonly available, the relationship of the vessel cost saving and improved product recovery to the additional overall adsorbent cost, and the like. It will also be appreciated that the doped adsorbent herein described and claimed can be used advantageously in practical commercial applications without the necessity for replacing all or essentially all of the undoped activated carbon adsorbent otherwise employed by the doped adsorbent of the invention.

It is contemplated, for example, that highly desirable advantages can be obtained by the substitution of doped activated carbon for from about 30% to about 60% of the total heat capacity of conventional activated carbon that would otherwise be loaded into commercial PSA units. The substitution of greater or lesser amounts of doped adsorbent can also obviously be made depending upon the overall circumstances of any given application.

It should also be noted that, in carrying out the process for producing the doped adsorbent of the invention, the inert inorganic material is most conveniently mixed with the partially activated carbon powder prior to the addition of a binder and pelletization. It is within the scope of the invention, however, to add binder to the components or either of them prior to such mixing if desired for some purpose and to use a combination of binders and quantities thereof outside the commonly used amounts as described above. Likewise, the use of molecular sieves having such inert inorganic materials added thereto to provide increased heat capacity for the doped adsorbent could also be advantageous in various PSA separations for which such molecular sieves are well suited for use as the selective adsorbent material.

The PSA process is an increasingly important technique for achieving desired gas separations in an ever increasing scope of commercial applications. Activated carbon adsorbents have an important role with respect to the enhanced performance of the PSA process for certain separations wherein activated carbon has inherent advantages over the use of molecular sieves or other adsorbents. The invention enables activated carbon adsorbents to be employed with enhanced performance, and under favorable operating and equipment cost conditions, as compared to the use of activated carbon in conventional practice heretofore.

The invention thus represents a significant development in the continuing efforts to enhance the overall performance and economics associated with the practice of the PSA technology in important gas separation operations.

I claim

1. A process for enhancing the heat capacity of activated carbon adsorbent pellets formed by adding a binder to partially activated carbon powder, pelletizing the powder-binder mixture, and further activating the resulting pellets at elevated temperature comprising mixing said partially activated carbon in its powder form with volume based higher heat capacity dense alumina in the form of corundum in a particle size range suitable for mixing therewith, prior to pelletization of the powder-binder mixture, the amount of said dense alumina in the form of corundum present in the mixture being from about 1% to about 25% by volume based on the total volume of said mixture of said dense alumina and activated carbon powder, said binder being present in an amount within the range of from about 0.5 to about 4.0% by weight of said binder based on the total weight of said activated carbon—dense alumina in the form of corundum—binder mixture, whereby the addition of said dense alumina in the form of corundum to the activated carbon powder facilitates the desired enhancing of the heat capacity of the resulting activated carbon adsorbent material.

2. The process of claim 1 in which said dense alumina has a particle density on the order of about 4,000 mg/m$^3$ and an average particle size of between about 10 and about 100 microns.

3. The process of claim 2 in which said activated carbon powder is obtained by grinding raw activated carbon material to a desired particle size on the order of from about 20 to about 80 microns.

4. The process of claim 3 in which said activated carbon powder has an average particle size on the order of about 30 microns.

5. The process of claim 3 in which the amount of said dense alumina added to the activated carbon powder comprises from about 1% to about 15% by volume based on the total volume of the dense alumina-activated carbon powder mixture.

6. The process of claim 5 in which said dense alumina comprises from about 5% to about 10% of the total volume of said mixture.

7. The process of claim 1 in which said adsorbent pellets of activated carbon, together with dense alumina and binder, are further activated by reaction with steam at said elevated temperature.

8. The process of claim 7 in which said elevated temperature is at least about 600° C.

9. An improved pelletized activated carbon adsorbent comprising:
(1) activated carbon; (2) dense alumina in the form of corundum having a volume-based higher heat capacity than said activated carbon; and (3) a binder present in an amount within the range of from about 0.5 to about 4.0% by weight of said binder based on the total weight of said activated carbon—dense alumina in the form of corundum—binder, said adsorbent being prepared by the process comprising mixing partially activated carbon powder with said dense alumina in a particle size range suitable for mixing therewith prior to pelletization, said dense alumina in the form of corundum comprising from about 1% to about 25% by volume of the total volume of the mixture of activated carbon powder and said dense phase alumina in the form of corundum.

10. The activated carbon adsorbent formulation of claim 9 in which said dense alumina has a particle density of about 4,000 mg/m$^3$ and an average particle size of between about 10 and about 100 microns.

11. The activated carbon adsorbent formulation of claim 10 in which said activated carbon powder has an average particle size on the order of from about 20 to about 80 microns.

12. The activated carbon adsorbent formulation of claim 10 in which the amount of dense alumina added to the activated carbon powder comprises from about 1% to about 15% by volume based on the total volume of said dense alumina-activated carbon powder mixture.

13. The activated carbon adsorbent formulation of claim 12 in which said dense alumina comprises from about 5% to about 10% of the total volume of said mixture.

14. The activated carbon adsorbent formulation of claim 9 in which said pellets comprising activated carbon, dense alumina and binder are activated by reaction with steam at elevated temperature.

15. The activated carbon adsorbent formulation of claim 14 in which said elevated temperature is at least about 600° C.

16. The activated carbon adsorbent formulation of claim 9 and including activated carbon pellets, prepared without the incorporation of said dense alumina in the form of corundum therein, mixed therewith, the activated carbon pellets containing said dense alumina in the form of corundum comprising from about 30 to about 60% of the total heat capacity of said activated carbon pellets.

17. The activated carbon adsorbent formulation of claim 16 in which said dense alumina comprises from about 5% to about 10% of the activated carbon-alumina mixture.

* * * * *